US012651570B2

(12) United States Patent
Kim et al.

(10) Patent No.: US 12,651,570 B2
(45) Date of Patent: Jun. 9, 2026

(54) PIXEL AND DISPLAY DEVICE INCLUDING THE SAME

(71) Applicant: Samsung Display Co., LTD., Yongin-si (KR)

(72) Inventors: Kwi Hyun Kim, Yongin-si (KR); Se Hyun Lee, Yongin-si (KR); Hak Sun Chang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/825,704

(22) Filed: Sep. 5, 2024

(65) Prior Publication Data

US 2025/0182687 A1 Jun. 5, 2025

(30) Foreign Application Priority Data

Dec. 5, 2023 (KR) .................. KR10-2023-0174691

(51) Int. Cl.
*G09G 3/3233* (2016.01)

(52) U.S. Cl.
CPC ... *G09G 3/3233* (2013.01); *G09G 2300/0465* (2013.01); *G09G 2300/0819* (2013.01);
(Continued)

(58) Field of Classification Search
CPC ......... G09G 3/3233; G09G 2300/0465; G09G 2300/0819; G09G 2300/0842;
(Continued)

(56) References Cited

U.S. PATENT DOCUMENTS 6,809,706 B2 * 10/2004 Shimoda .............. G09G 3/3233 345/82
7,274,363 B2 * 9/2007 Ishizuka .............. G09G 3/3233 345/211
(Continued)

FOREIGN PATENT DOCUMENTS

| | | | |
|---|---|---|---|
| DE | 11-2019-005892 | T5 | 8/2021 |
| JP | 7415271 | B2 | 1/2024 |

OTHER PUBLICATIONS

Kei Kimura et al., "New pixel driving circuit using self-discharging compensation method for high-resolution OLED micro displays on a silicon backplane", Journal of the SID, vol. 25, Issue 3, Apr. 18, 2017.

*Primary Examiner* — Jeff Piziali
(74) *Attorney, Agent, or Firm* — Womble Bond Dickinson (US) LLP

(57) ABSTRACT

Provided herein may be a pixel including a first transistor including a first electrode connected to a first node, a second electrode connected to a second node, and a gate electrode connected to a third node, a second transistor connected between a data line and the third node, and including a gate electrode electrically connected to a first sub-gate line, a third transistor connected between a first power line, which is configured to supply a first power voltage, and the first node, and including a gate electrode electrically connected to an emission control line, a first capacitor connected between the first node and the third node, and a light-emitting element connected between the second node and a second power line, which is configured to supply a second power voltage.

13 Claims, 11 Drawing Sheets

(52) U.S. Cl.
CPC ............... *G09G 2300/0842* (2013.01); *G09G 2300/0861* (2013.01); *G09G 2310/08* (2013.01)

(58) Field of Classification Search
CPC ....... G09G 2300/0861; G09G 2310/08; G09G 2300/0426; G09G 2300/0852; H10D 86/481; H10K 59/1213; H10K 59/1216
See application file for complete search history.

(56) References Cited

U.S. PATENT DOCUMENTS

| | | | | |
|---|---|---|---|---|
| 7,564,433 | B2 * | 7/2009 | Hector | G09G 3/3233 345/82 |
| 8,013,816 | B2 * | 9/2011 | Kim | G09G 3/3275 345/82 |
| 10,013,917 | B2 * | 7/2018 | Kim | G09G 3/3258 |
| 10,170,048 | B2 * | 1/2019 | Lee | G09G 3/3258 |
| 10,170,054 | B2 * | 1/2019 | Park | G09G 3/3275 |
| 10,373,554 | B2 * | 8/2019 | Chaji | G09G 3/3233 |
| 10,410,579 | B2 * | 9/2019 | Chaji | G09G 3/3233 |
| 10,504,436 | B2 * | 12/2019 | He | G09G 3/3258 |
| 10,586,491 | B2 * | 3/2020 | Chaji | G09G 3/3233 |
| 10,714,009 | B2 * | 7/2020 | Lin | H10D 86/423 |
| 10,971,078 | B2 * | 4/2021 | Talebzadeh | G09G 3/3283 |
| 11,651,733 | B1 * | 5/2023 | Sun | G09G 3/3233 345/212 |
| 11,735,113 | B2 * | 8/2023 | Dong | G09G 3/3241 345/204 |
| 11,862,091 | B1 * | 1/2024 | Cheng | G09G 3/3233 |
| 12,057,067 | B2 * | 8/2024 | Wang | G09G 3/3233 |
| 2002/0030647 | A1 * | 3/2002 | Hack | G09G 3/3283 345/82 |
| 2003/0030603 | A1 * | 2/2003 | Shimoda | G09G 3/3233 345/76 |
| 2010/0103081 | A1 * | 4/2010 | Takasugi | G09G 3/3233 313/505 |
| 2012/0235973 | A1 * | 9/2012 | Yoo | G09G 3/3233 345/76 |
| 2013/0100173 | A1 * | 4/2013 | Chaji | G09G 5/10 345/76 |
| 2013/0127815 | A1 * | 5/2013 | Yoo | G09G 3/3233 345/212 |
| 2014/0139510 | A1 * | 5/2014 | Han | G09G 3/3233 345/82 |
| 2015/0145849 | A1 * | 5/2015 | Choi | G09G 3/3233 345/212 |
| 2015/0379956 | A1 * | 12/2015 | Nonaka | G09G 3/325 315/172 |
| 2016/0104427 | A1 * | 4/2016 | Matsueda | G09G 3/3233 345/212 |
| 2017/0053595 | A1 * | 2/2017 | Liu | G09G 3/3233 |
| 2017/0124954 | A1 * | 5/2017 | Park | G09G 3/3233 |
| 2017/0132975 | A1 * | 5/2017 | Park | G09G 3/3233 |
| 2017/0186374 | A1 * | 6/2017 | Kim | G09G 3/3258 |
| 2018/0068611 | A1 * | 3/2018 | Chaji | G09G 3/325 |
| 2018/0182303 | A1 * | 6/2018 | Jung | G09G 3/3258 |
| 2019/0164501 | A1 * | 5/2019 | Chai | G09G 3/3233 |
| 2019/0251899 | A1 * | 8/2019 | Lee | G09G 3/3266 |
| 2019/0311676 | A1 * | 10/2019 | Chaji | G09G 3/3233 |
| 2020/0090590 | A1 * | 3/2020 | Kim | G09G 3/3233 |
| 2020/0202794 | A1 * | 6/2020 | Chen | G09G 3/3291 |
| 2021/0012719 | A1 * | 1/2021 | Chen | G09G 3/3291 |
| 2021/0125544 | A1 * | 4/2021 | Park | G09G 3/32 |
| 2022/0114961 | A1 * | 4/2022 | Yamamoto | G09G 3/3233 |
| 2023/0197000 | A1 * | 6/2023 | Jo | G09G 3/2007 345/690 |
| 2024/0363055 | A1 * | 10/2024 | Zhang | G09G 3/32 |
| 2024/0381696 | A1 * | 11/2024 | Sakaguchi | H10K 59/1216 |

* cited by examiner

PIXEL AND DISPLAY DEVICE INCLUDING THE SAME

CROSS-REFERENCE TO RELATED APPLICATION

The present application claims priority to, and the benefit of, Korean Patent Application Number 10-2023-0174691, filed on Dec. 5, 2023, in the Korean Intellectual Property Office, the entire disclosure of which is incorporated herein by reference.

BACKGROUND

1. Field

Various embodiments of the present disclosure relate to a pixel and a display device including the pixel.

2. Description of Related Art

With the development of information technology, the importance of a display device, which is a connection medium between a user and information, has been emphasized. Owing to the importance of display devices, the use of various kinds of display devices, such as a liquid crystal display device and an organic light-emitting display device, has increased.

Recently, there has been development in head-mounted display devices (HMDs). The head-mounted display device (HMDs) are display devices, which allow a user to wear in the form of glasses or a helmet, and are used to create virtual reality (VR) or augmented reality (AR) experiences where the focus is formed at a close distance in front of the eyes of the user. Head-mounted display devices employ high-resolution panels, using pixels that can be applied to high-resolution panels.

SUMMARY

Various embodiments of the present disclosure are directed to a pixel applicable to a high-resolution panel, and a display device including the pixel.

One or more embodiments of the present disclosure may provide a pixel including a first transistor including a first electrode connected to a first node, a second electrode connected to a second node, and a gate electrode connected to a third node, a second transistor connected between a data line and the third node, and including a gate electrode electrically connected to a first sub-gate line, a third transistor connected between a first power line, which is configured to supply a first power voltage, and the first node, and including a gate electrode electrically connected to an emission control line, a first capacitor connected between the first node and the third node, and a light-emitting element connected between the second node and a second power line, which is configured to supply a second power voltage.

During an emission period in which the light-emitting element is configured to emit light at a luminance corresponding to current supplied from the first transistor, the second power voltage may be configured to have a first voltage level, wherein, during a data write period before the emission period, the second power voltage is configured to have a second voltage level that is higher than the first voltage level.

A single frame period may include an initialization period, a compensation period, the data write period, and the emission period, wherein, during the data write period, the third transistor is configured to be set to a turn-off state, the first transistor and the second transistor are configured to be set to a turn-on state, and a data signal having a data voltage level is configured to be supplied to the data line.

During the emission period after the data write period, the second transistor may be configured to be set to the turn-off state, the first transistor and the third transistor may be configured to be set to the turn-on state, and a data signal having a reference voltage level, which is lower than the data voltage level, may be configured to be supplied to the data line.

The reference voltage level may be lower than the first power voltage, and is higher than the first voltage level.

During the compensation period before the data write period, the third transistor may be configured to be set to the turn-off state, the first transistor and the second transistor may be configured to be set to the turn-on state, a data signal having a reference voltage level may be configured to be supplied to the data line, and the second power voltage is configured to have the second voltage level.

During the initialization period before the compensation period, the first transistor, the second transistor, and the third transistor may be configured to be set to the turn-on state, a data signal having a reference voltage level may be configured to be supplied to the data line, and the second power voltage may be configured to have the first voltage level.

The first capacitor may include a metal-insulator-metal (MIM) capacitor.

The first capacitor may include a metal oxide semiconductor (MOS) capacitor.

The pixel may further include a second capacitor connected between the first node and the third node.

The first capacitor may include a metal-insulator-metal (MIM) capacitor, and the second capacitor includes a metal oxide semiconductor (MOS) capacitor.

The first voltage level and the second voltage level may be lower than the first power voltage.

One or more embodiments of the present disclosure may provide a display device including pixels connected to gate lines, data lines, and emission control lines, wherein one of the pixels at an i-th pixel row and at a j-th pixel column (i and j being integers) includes a first transistor including a first electrode connected to a first node, a second electrode connected to a second node, and a gate electrode connected to a third node, a second transistor connected between a j-th data line among the data lines and the third node, and configured to receive a gate signal through an i-th gate line among the gate lines, a third transistor connected between the first node and a first power line configured to supply a first power voltage, and configured to receive an emission control signal through an i-th emission control line among the emission control lines, a first capacitor connected between the first node and the third node, and a light-emitting element connected between the second node and a second power line configured to supply a second power voltage.

During an emission period in which the light-emitting element is configured to emit light at a luminance corresponding to current supplied from the first transistor, the second power voltage may be configured to have a first voltage level, wherein, during a data write period before the emission period, the second power voltage is configured to have a second voltage level that is higher than the first voltage level.

A single frame period may include an initialization period, a compensation period, the data write period, and the emission period, wherein, during the data write period, the gate signal for setting the second transistor to a turn-on state is configured to be supplied to the i-th gate line, the emission control signal for setting the third transistor to a turn-off state is configured to be supplied to the i-th emission control line, and a data signal having a data voltage level is configured to be supplied to the j-th data line.

During the emission period after the data write period, the emission control signal for setting the third transistor to the turn-on state may be configured to be supplied to the i-th emission control line, the gate signal for setting the second transistor to the turn-off state may be configured to be supplied to the i-th gate line, and a data signal having a reference voltage level that is lower than the data voltage level may be configured to be supplied to the j-th data line.

During the compensation period before the data write period, the gate signal for setting the second transistor to the turn-on state may be configured to be supplied to the i-th gate line, the emission control signal for setting the third transistor to the turn-off state may be configured to be supplied to the i-th emission control line, and a data signal having a reference voltage level may be configured to be supplied to the j-th data line.

The first capacitor may include a metal-insulator-metal (MIM) capacitor.

The first capacitor may include a metal oxide semiconductor (MOS) capacitor.

The display device may further include a second capacitor connected between the first node and the third node, wherein the first capacitor includes a metal-insulator-metal (MIM) capacitor, and the second capacitor includes a metal oxide semiconductor (MOS) capacitor.

DETAILED DESCRIPTION

Figure 1:
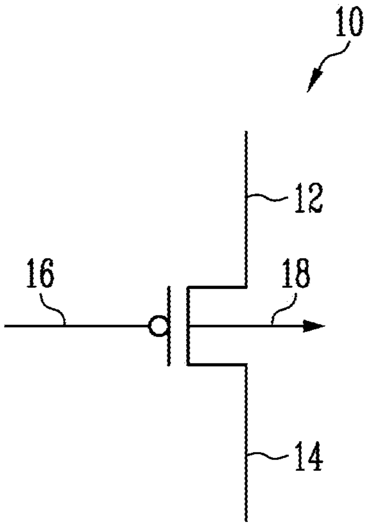
FIG. 1 is a diagram illustrating a transistor in accordance with one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure. The present disclosure covers all modifications, equivalents, and replacements within the idea and technical scope of the present disclosure. Further, each of the features of the various embodiments of the present disclosure may be combined with each other, in part or in whole, and technically various interlocking and driving are possible. Each embodiment may be implemented independently of each other or may be implemented together in an association.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a transistor 10 in accordance with one or more embodiments of the present disclosure.

Referring to FIG. 1, the transistor 10 in accordance with one or more embodiments of the present disclosure may include a first electrode 12, a second electrode 14, a gate electrode 16, and a body electrode 18. For example, the transistor 10 may be a metal-oxide-semiconductor field-effect transistor (MOSFET). The transistor 10 (e.g., an MOSFET) including the body electrode 18 is suitable for implementing a high-resolution pixel due to a reduced mounting area thereof.

The transistor 10 may be formed on a silicon wafer. For example, a panel may be implemented by stacking layers such as a transistor layer, an emission layer, and a cover layer on the silicon wafer. However, the foregoing description is illustrative, and the transistor 10 may be formed on various known substrates (e.g., a glass substrate).

The first electrode 12 of the transistor 10 may be set to a source electrode (or a drain electrode), and the second electrode 14 thereof may be set to a drain electrode (or a source electrode). In the case where the transistor 10 includes the body electrode 18, a threshold voltage of the transistor 10 may be changed by body effect. The body effect refers to a change in the threshold voltage of the transistor 10 due to a voltage difference between the body electrode 18 and the first electrode 12 of the transistor 1.

Figure 2:
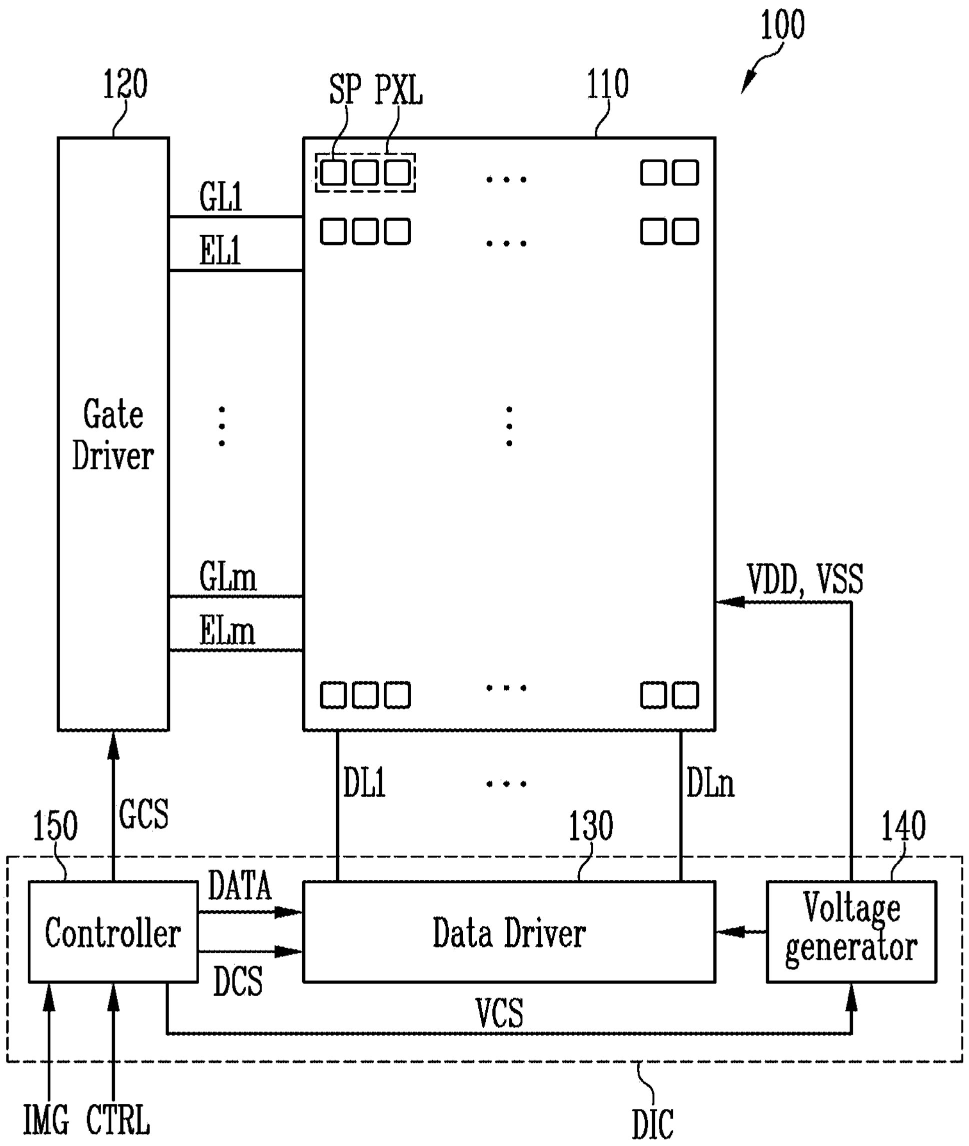
FIG. 2 is a block diagram illustrating a display device in accordance with embodiments of the present disclosure.

FIG. 2 is a block diagram illustrating one or more embodiments of a display device 100.

Referring to FIG. 2, the display device 100 may include a display panel 110, a gate driver 120, a data driver 130, a voltage generator 140, and a controller 150.

The display panel 110 may include sub-pixels SP. The sub-pixels SP may be connected to the gate driver 120 through first to m-th gate lines GL1 to GLm. The sub-pixels SP may be connected to the data driver 130 through first to n-th data lines DL1 to DLn.

Each of the sub-pixels SP may include at least one light-emitting element configured to generate light. Accordingly, each of the sub-pixels SP may generate light in a corresponding color, such as red, green, blue, cyan, magenta, or yellow. Two or more sub-pixels among the sub-pixels SP may form one pixel PXL. For example, as illustrated in FIG. 2, three sub-pixels may form one pixel PXL.

The gate driver 120 may be connected to sub-pixels SP arranged in a row direction through first to m-th gate lines GL1 to GLm. The gate driver 120 may output gate signals to the first to m-th gate lines GL1 to GLm in response to a gate control signal GCS. In embodiments, the gate control signal GCS may include a start signal instructing each frame to start, a horizontal synchronization signal for outputting gate signals in synchronization with a timing at which data signals are applied, and the like.

In embodiments, there may be further provided first to m-th emission control lines EL1 to ELm connected to the sub-pixels SP in the row direction. In this case, the gate driver 120 may include an emission control driver configured to control the first to m-th emission control lines EL1 to ELm. The emission control driver may operate under the control of the controller 150.

The gate driver 120 may be located on one side of the display panel 110. However, embodiments are not limited to the aforementioned example. For example, the gate driver 120 may be divided into two or more drivers that are physically and/or logically distinguished from each other. The drivers may be respectively located on a first side of the display panel 110 and a second side of the display panel 110 opposite to the first side. As such, the gate driver 120 may be located around the display panel 110 in various forms depending on embodiments.

The data driver 130 may be connected to sub-pixels SP arranged in a column direction through the first to n-th data lines DL1 to DLn. The data driver 130 may receive image data DATA and a data control signal DCS from the controller 150. The data driver 130 may operate in response to the data control signal DCS. In embodiments, the data control signal DCS may include a source start pulse, a source shift clock, a source output enable signal, and the like.

By using voltages from the voltage generator 140, the data driver 130 may apply data signals having grayscale voltages corresponding to the image data DATA to the first to n-th data lines DL1 to DLn. When a gate signal is applied to each of the first to m-th gate lines GL1 to GLm, data signals each having a data voltage level corresponding to the image data DATA may be applied to the data lines DL1 to DLm. Hence, the corresponding sub-pixels SP may generate light corresponding to the data signals. As a result, an image may be displayed on the display panel 110.

In one or more embodiments, the data driver 130 may use voltages from the voltage generator 140, and thus may apply data signals having a reference voltage level to the data lines DL1 to DLm. The reference voltage level may be lower than the data voltage level.

In embodiments, the gate driver 120 and the data driver 130 may include complementary metal-oxide semiconductor (CMOS) circuit elements.

The voltage generator 140 rate in response to a voltage control signal VCS provided from the controller 150. The voltage generator 140 is configured to generate a plurality of voltages and provide the generated voltages to components of the display device 100. For example, the voltage generator 140 may receive an input voltage from an external device provided outside the display device 100, may adjust the received voltage, and may regulate the adjusted voltage, thus generating a plurality of voltages.

The voltage generator 140 may generate a first power voltage VDD and a second power voltage VSS. The generated first and second power voltages VDD and VSS may be provided to the sub-pixels SP. The first power voltage VDD may have a relatively high voltage level. The second power voltage VSS may have a voltage level that is lower than the first power voltage VDD. In other embodiments, the first power voltage VDD or the second power voltage VSS may be provided by an external device of the display device 100.

In one or more embodiments, the voltage generator 140 may generate a second power voltage VSS having a first voltage level, and a second power voltage VSS having a second voltage level, under the control of the controller 150. Each of the first voltage level and the second voltage level may be lower than the voltage level of the first power voltage VDD. The second voltage level may be higher than the first voltage level.

The controller 150 may control overall operations of the display device 100. The controller 150 may receive input image data IMG and a control signal CTRL for controlling an operation of displaying the input image data IMG from an external device. The controller 150 may provide a gate control signal GCS, a data control signal DCS, and a voltage control signal VCS, in response to the control signal CTRL.

The controller 150 may convert the input image data IMG to be suitable for the display device 100 or the display panel 110, and then may output image data DATA. In embodiments, the controller 150 may align the input image data IMG to be suitable for the sub-pixels SP on a row basis and then output the image data DATA.

Two or more components of the data driver 130, the voltage generator 140, and the controller 150 may be mounted on a single integrated circuit. As illustrated in FIG. 2, the data driver 130, the voltage generator 140, and the controller 150 may be included in a driver integrated circuit DIC. In this case, the data driver 130, the voltage generator 140, and the controller 150 may be components that are functionally separated from each other in the single driver integrated circuit DIC. In other embodiments, at least one of the data driver 130, the voltage generator 140, or the controller 150 may be provided as a component separated from the driver integrated circuit DIC.

Figure 3:
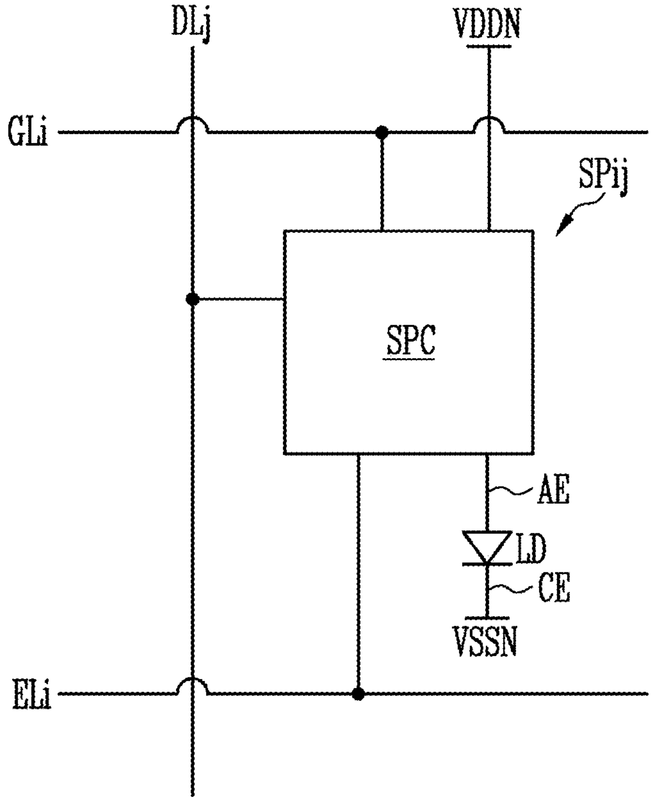
FIG. 3 is a block diagram illustrating one or more embodiments of any one of sub-pixels of FIG. 2.

FIG. 3 is a block diagram illustrating one or more embodiments of any one of the sub-pixels SP of FIG. 2. In FIG. 3, there is illustrated a sub-pixel SPij located on an i-th row (where i is an integer between 1 and m, inclusive) and on a j-th column (where j is an integer between 1 and n, inclusive) among the sub-pixels SP of FIG. 2.

Referring to FIG. 3, the sub-pixel SPij may include a sub-pixel circuit SPC and a light-emitting element LD.

The light-emitting element LD is connected between a first power voltage node VDDN and a second power voltage node VSSN. Here, the first power voltage node VDDN may be a node provided to transmit the first power voltage VDD of FIG. 1. The second power voltage node VSSN may be a node provided to transmit the second power voltage VSS of FIG. 1.

An anode electrode AE of the light-emitting element LD may be connected to the first power voltage node VDDN through the sub-pixel circuit SPC. A cathode electrode CE of the light-emitting element LD may be connected to the second power voltage node VSSN. For example, the anode electrode AE of the light-emitting element LD may be connected to the first power voltage node VDDN through one or more transistors included in the sub-pixel circuit SPC.

The sub-pixel circuit SPC may be connected to an i-th gate line GLi among the first to m-th gate lines GL1 to GLm of FIG. 1, to an i-th emission control line ELi among the first to m-th emission control lines EL1 to ELm of FIG. 1, and to a j-th data line DLj among the first to n-th data lines DL1 to DLn of FIG. 1. The sub-pixel circuit SPC is configured to control the light-emitting element LD in response to signals respectively received through the aforementioned signal lines.

The sub-pixel circuit SPC may operate in response to a gate signal received through the i-th gate line GLi.

The sub-pixel circuit SPC may operate in response to an emission control signal received through the i-th emission control line ELi. In embodiments, the i-th emission control line ELi may include one or more sub-emission control lines. In the case where the i-th emission control line ELi includes two or more sub-emission control lines, the sub-pixel circuit SPC may operate in response to emission control signals received through the corresponding sub-emission control lines.

The sub-pixel circuit SPC may receive a data signal through a j-th data line DLj. The sub-pixel circuit SPC may store a voltage corresponding to the data signal, in response to a gate signal received through the i-th gate line GLi. The sub-pixel circuit SPC may adjust current flowing from the first power voltage node VDDN to the second power voltage node VSSN through the light-emitting element LD according to the stored voltage, in response to the emission control signal received through the i-th emission control line ELi. Therefore, the light-emitting element LD may emit light at a luminance corresponding to the data signal.

Figure 4:
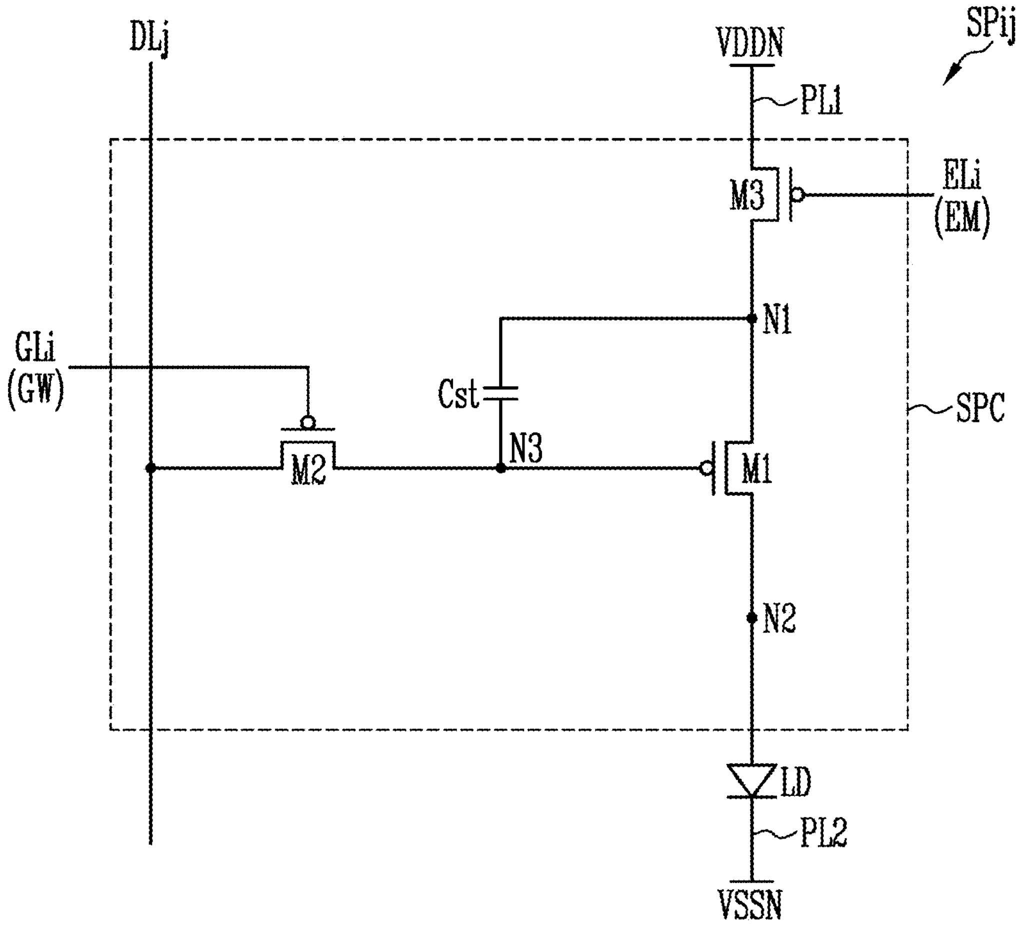
FIG. 4 is a circuit diagram illustrating one or more embodiments of a sub-pixel shown in FIG. 3.

FIG. 4 is a circuit diagram illustrating one or more embodiments of the sub-pixel SPij of FIG. 3.

Referring to FIG. 4, the sub-pixel SPij may include a sub-pixel circuit SPC and a light-emitting element LD.

The light-emitting element LD may be connected between a first power line PL1 and a second power line PL2. For example, a first electrode (or an anode electrode) of the light-emitting element LD may be connected to the first power voltage node VDDN via a second node N2, a first transistor M1, a first node N1, a third transistor M3, and the first power line PL1.

A second electrode (or a cathode electrode) of the light-emitting element LD may be connected to the second power voltage node VSSN through the second power line PL2.

The light-emitting element LD may generate light of a certain luminance corresponding to the amount of current that is supplied from the first power line PL1 to the second power line PL2 via the pixel circuit.

An organic light-emitting diode may be selected as the light-emitting element LD. Furthermore, an inorganic light-emitting diode, such as a micro light-emitting diode (LED) or a quantum dot light-emitting diode, may be selected as the light-emitting element LD. The light-emitting element LD may be an element formed of a combination of organic material and inorganic material.

Although FIG. 4 illustrates that the sub-pixel SPij includes a single light-emitting element LD, the sub-pixel SPij in one or more embodiments may include a plurality of light-emitting elements LD. The plurality of light-emitting elements LD may be connected in series, in parallel, or in series-parallel to each other.

The sub-pixel circuit SPC may be connected to an i-th gate line GLi, to an i-th emission control line ELi, and to a j-th data line DLj. The sub-pixel circuit SPC may include first to third transistors M1, M2, and M3, and a capacitor Cst.

Each of the first to third transistors M1, M2, and M3 may each be a transistor including a body electrode. For example, each of the first to third transistors M1, M2, and M3 may be formed of a metal oxide semiconductor field effect transistor (MOSFET). In this case, the first to third transistors M1, M2, and M3 may be mounted in a relatively small area, thus enabling the sub-pixel SPij to be applied to a high-resolution panel.

In one or more embodiments, each of the first to third transistors M1, M2, and M3 may be formed of a P-type transistor. However, this is illustrative, and at least one of the first to third transistors M1, M2, or M3 may be substituted with an N-type transistor.

The first transistor M1 may include a first electrode connected to the first node N1, and a second electrode connected to the second node N2. Here, the term "connected" implies being electrically linked or joined. A gate electrode of the first transistor M1 may be connected to a third node N3. The first node N1 may refer to a node to which a second electrode of the third transistor M3 is connected. The second node N2 may refer to a node to which the first electrode of the light-emitting element LD is connected. The first transistor M1 may control, in response to the voltage of the third node N3, the amount of current to be supplied from the first power line PL1 supplying the first power voltage VDD to the second power line PL2 supplying the second power voltage VSS via the light-emitting element LD.

The second transistor M2 may be connected between the data line DLj and the third node N3. A gate electrode of the second transistor M2 may be electrically connected to the i-th gate line GLi. If a gate signal GW for setting the second transistor M2 to a turn-on state is supplied to the i-th gate line GLi, then the data line DLj and the third node N3 may be electrically connected to each other.

A first electrode of the third transistor M3 may be electrically connected to the first power line PL1, and the second electrode thereof may be connected to the first node N1. A gate electrode of the third transistor M3 may be electrically connected to the i-th emission control line ELi. If an emission control signal EM for setting the third transistor M3 to a turn-on state is supplied to the i-th emission control line ELi, the first power line PL1 and the first node N1 may be electrically connected to each other.

The capacitor Cst may be connected between the first node N1 and the third node N3. The capacitor Cst may transmit variance in voltage of the first node N1 to the third node N3 (e.g., may transmit a range of voltages). Furthermore, the capacitor Cst may store the voltage of the third node N3.

In one or more embodiments, the capacitor Cst may be implemented using a metal-insulator-metal (MIM) capacitor.

Figure 5:
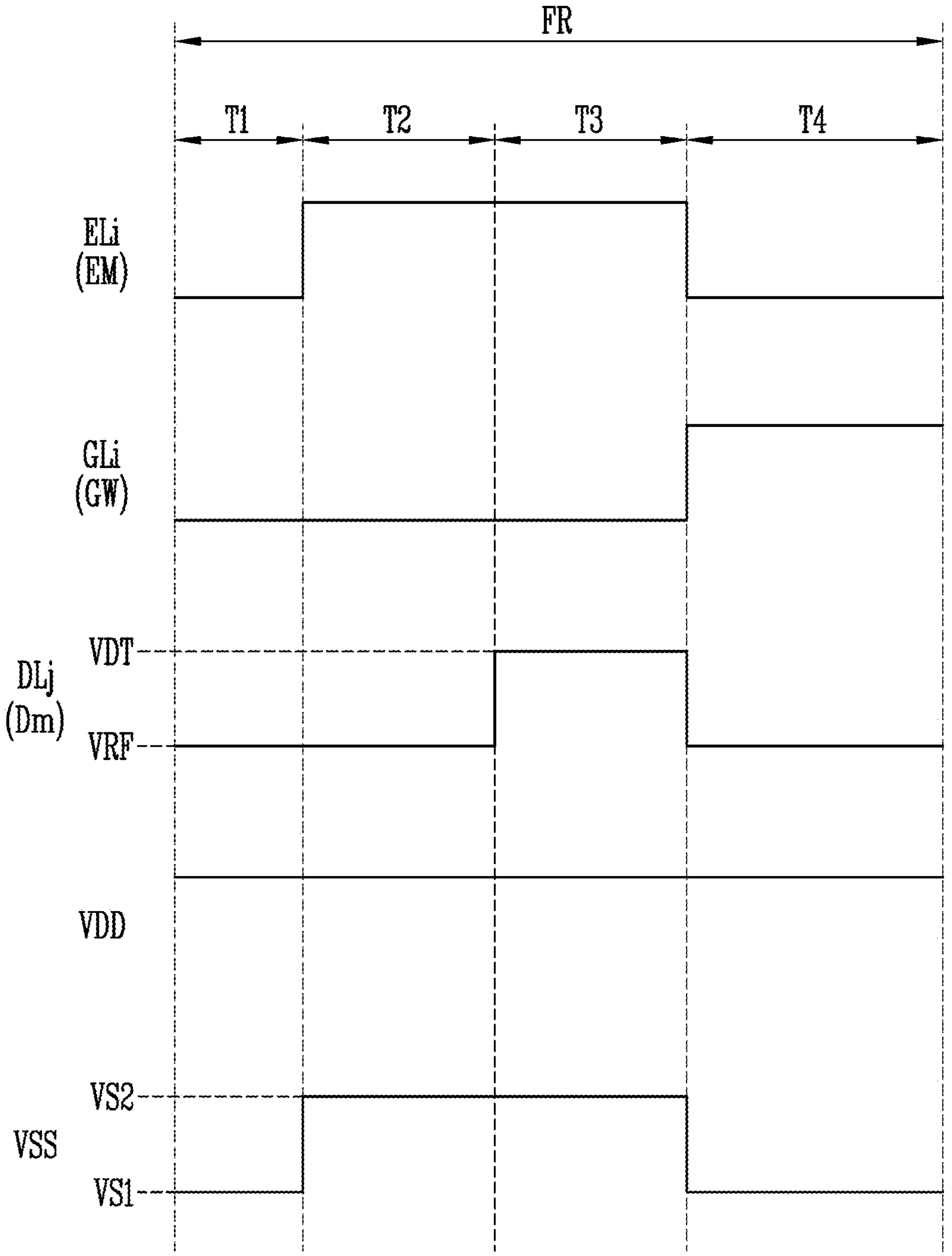
FIG. 5 is a wavelength diagram illustrating one or more embodiments of a method of driving the sub-pixel shown in FIG. 4.

FIG. 5 is a wavelength diagram illustrating one or more embodiments of a method of driving the sub-pixel SPij shown in FIG. 4.

Referring to FIGS. 2, 4, and 5, there are illustrated signals supplied to the sub-pixel SPij from the gate driver 120, the data driver 130, and the voltage generator 140 of the display device 100 during the frame period FR. The frame period FR may refer to a period in which an image of one screen is displayed on the display panel. The frame period FR may include first to fourth periods T1, T2, T3, and T4.

The gate driver 120 may supply a gate signal GW for setting the second transistor M2 to a turn-on state to the i-th gate line GLi during first to third periods T1, T2, and T3.

In one or more embodiments, the emission control driver of the gate driver 120 may supply an emission control signal EM for setting the third transistor M3 to a turn-on state to the emission control line ELi during a first period T1 and during a fourth period T4.

The data driver 130 may supply a data signal Dm having a data voltage level VDT to the data line DLj during the third period T3. The data driver 130 may supply a data signal Dm having a reference voltage level VRF to the data line DLj during the first, second, and fourth periods T1, T2, and T4. The reference voltage level VRF may be lower than the data voltage level VDT. The reference voltage level VRF may be higher than each of the first voltage level VS1 and the second voltage level VS2.

The voltage generator 140 may supply the first power voltage VDD to the first power voltage node VDDN during the first to fourth periods T1, T2, T3, and T4 under the control of the controller 150.

The voltage generator 140 may supply the second power voltage VSS having the first voltage level VS1 to the second power voltage node VSSN during the first and fourth periods T1 and T4, and may supply the second power voltage VSS having the second voltage level VS2 to the second power voltage node VSSN during the second and third periods T2 and T3. The second voltage level VS2 may be higher than the first voltage level VS1. Each of the first voltage level VS1 and the second voltage level VS2 may be lower than the voltage level of the first power voltage VDD.

The first period T1 may be a period in which the first power voltage VDD is supplied to the first node N1, and a data signal Dm having the reference voltage level VRF is supplied to the third node N3. The first period T1 may be referred to as an initialization period.

The second period T2 may be a period in which the data signal Dm having the reference voltage level VRF is supplied to the third node N3, and the second power voltage VSS having the second voltage level VS2 is supplied to the second power voltage node VSSN. During the second period T2, the threshold voltage of the first transistor M1 is stored in the capacitor Cst. The second period T2 may be referred to as a threshold voltage compensation period.

The third period T3 may be a period in which the data signal Dm having the data voltage level VDT is supplied to the third node N3, and the second power voltage VSS having the second voltage level VS2 is supplied to the second power voltage node VSSN. During the third period T3, the threshold voltage of the first transistor M1 is stored in the capacitor Cst. The third period T3 may be referred to as a data write period.

The fourth period T4 may be a period in which the second power voltage VSS having the first voltage level VS1 is supplied to the second power voltage node VSSN. During the fourth period T3, the first transistor M1 may control, in response to the voltage of the third node N3, the amount of current flowing from the first power voltage node VDDN to the second power voltage node VSSN via the light-emitting element LD. During the fourth period T4, the light-emitting element LD may emit light at a luminance corresponding to the amount of current supplied from the first transistor M1. The fourth period T4 may be referred to as an emission period.

FIGS. 6 to 9 are circuit diagrams illustrating operation processes of the sub-pixel in response to signals of FIG. 5. A sub-pixel circuit SPC of FIGS. 6 to 9 may correspond to the sub-pixel circuit SPC of FIG. 4.

Figure 6:
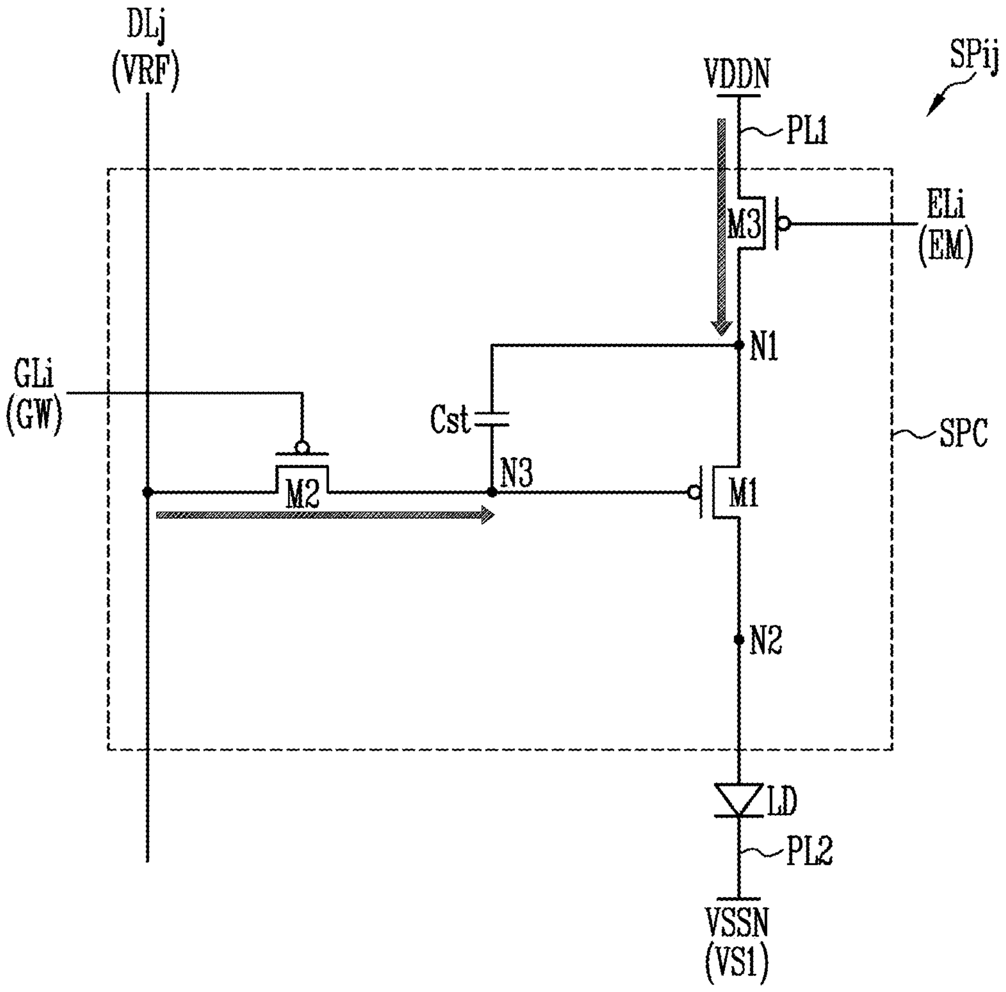
FIGS. 6 to 9 are circuit diagrams illustrating operation processes of the sub-pixel in response to signals of FIG. 5.

Referring to FIGS. 5 and 6, a gate signal GW for setting the second transistor M2 to a turn-on state is supplied to the gate line GLi during the first period T1. Furthermore, during the first period T1, an emission control signal EM for setting the third transistor M3 to a turn-on state is supplied to the emission control line ELi. If the third transistor M3 is turned on, the first power voltage VDD is supplied to the first node N1.

During the first period T1, a second power voltage VSS having the first voltage level VS1 is supplied to the second power voltage node VSSN, and a data signal having the reference voltage level VRF is supplied to the data line DLj.

If the second transistor M2 is turned on, the data signal having the reference voltage level VRF is supplied from the data line DLj to the third node N3. Here, the capacitor Cst may be initialized by a voltage corresponding to the reference voltage level VRF and the first power voltage VDD. For example, the first capacitor C1 may be charged with a voltage corresponding to the reference voltage level VRF and a voltage corresponding to the first power voltage VDD regardless of a voltage charged in a preceding period (or a preceding frame period) during the first period T1.

Figure 7:
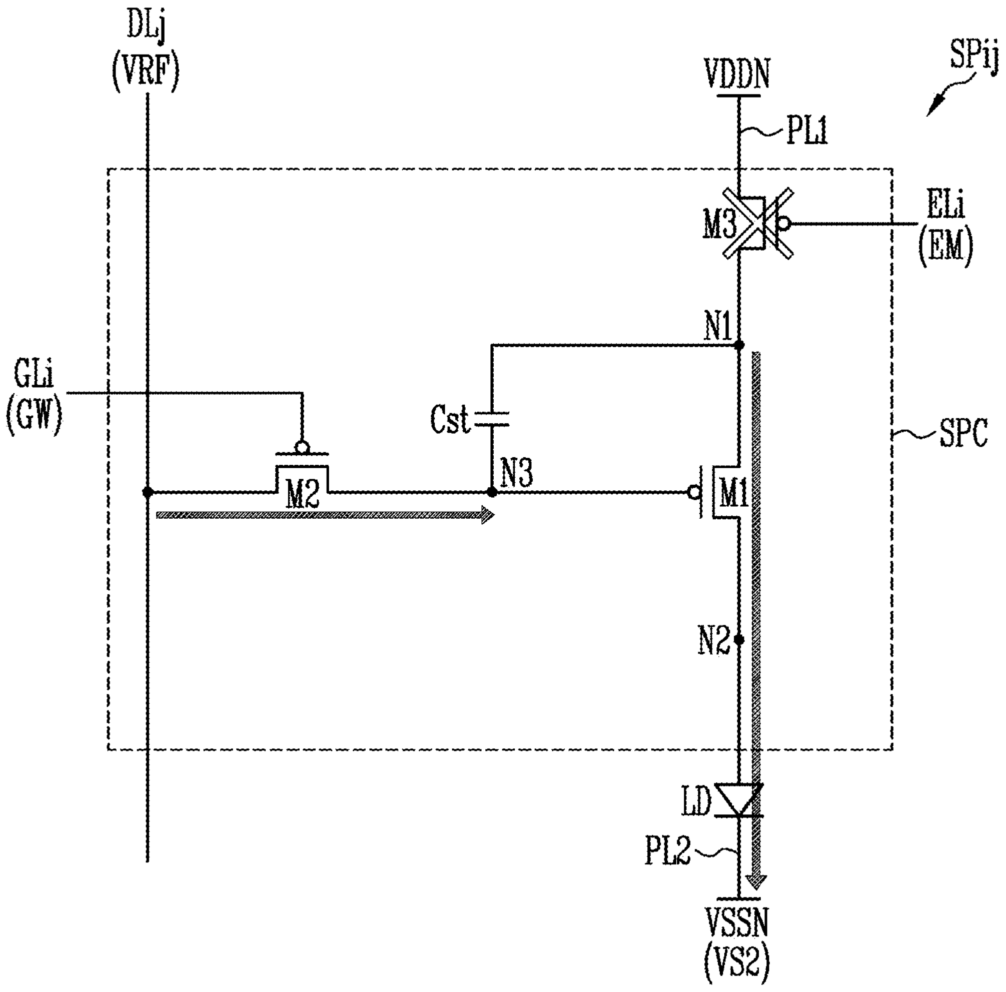

Referring to FIGS. 5 and 7, during the second period T2, the first and second transistors M1 and M2 may be maintained in the turn-on state. During the second period T2, an emission control signal EM for setting the third transistor M3 to a turn-off state may be supplied to the emission control line ELi. If the third transistor M3 is turned off, the electrical connection between the first power line PL1 and the first node N1 may be interrupted.

During the second period T2, a second power voltage VSS having the second voltage level VS2 is supplied to the second power voltage node VSSN, and a data signal having the reference voltage level VRF is supplied to the data line DLj.

Because the second transistor M2 is set to the turn-on state during the second period T2, the data signal having the reference voltage level VRF is supplied to the third node N3. The voltage on the first node N1 may decrease from the first power voltage VDD to a voltage obtained by adding the threshold voltage of the first transistor M1 to a voltage corresponding to the reference voltage level VRF. The voltage of the third node N3 may be maintained at the voltage corresponding to the reference voltage level VRF. Therefore, during the second period T2, the threshold voltage of the first transistor M1 may be stored in the capacitor Cst.

Here, to enable the light-emitting element LD to be maintained in a non-emission state, the following equation should be satisfied.

$$Vref + Vth - Vs2 < Vf \qquad \text{Equation 1}$$

Vref may denote the voltage corresponding to the reference voltage level VRF. Vth may denote the threshold voltage of the first transistor M1. Vs2 may denote a voltage corresponding to the second voltage level VS2. Vf may denote a driving voltage suitable to allow the light-emitting element LD to emit light.

During the second period T2, as the second power voltage VSS has the second voltage level VS2 satisfying Equation 1, the light-emitting element LD may be maintained in the non-emission state even when current supplied from the first transistor M1 passes through the light-emitting element LD.

That is, in the case of the present disclosure, even if a bypass circuit for maintaining the non-emission state of the light-emitting element LD is not included, the light-emitting element LD may be maintained in the non-emission state because the second power voltage VSS has the second voltage level VS2 that satisfies Equation 1. Accordingly, a pixel with a simplified pixel circuit and improved integration, which is suitable for a high-resolution panel, may be implemented.

Figure 8:
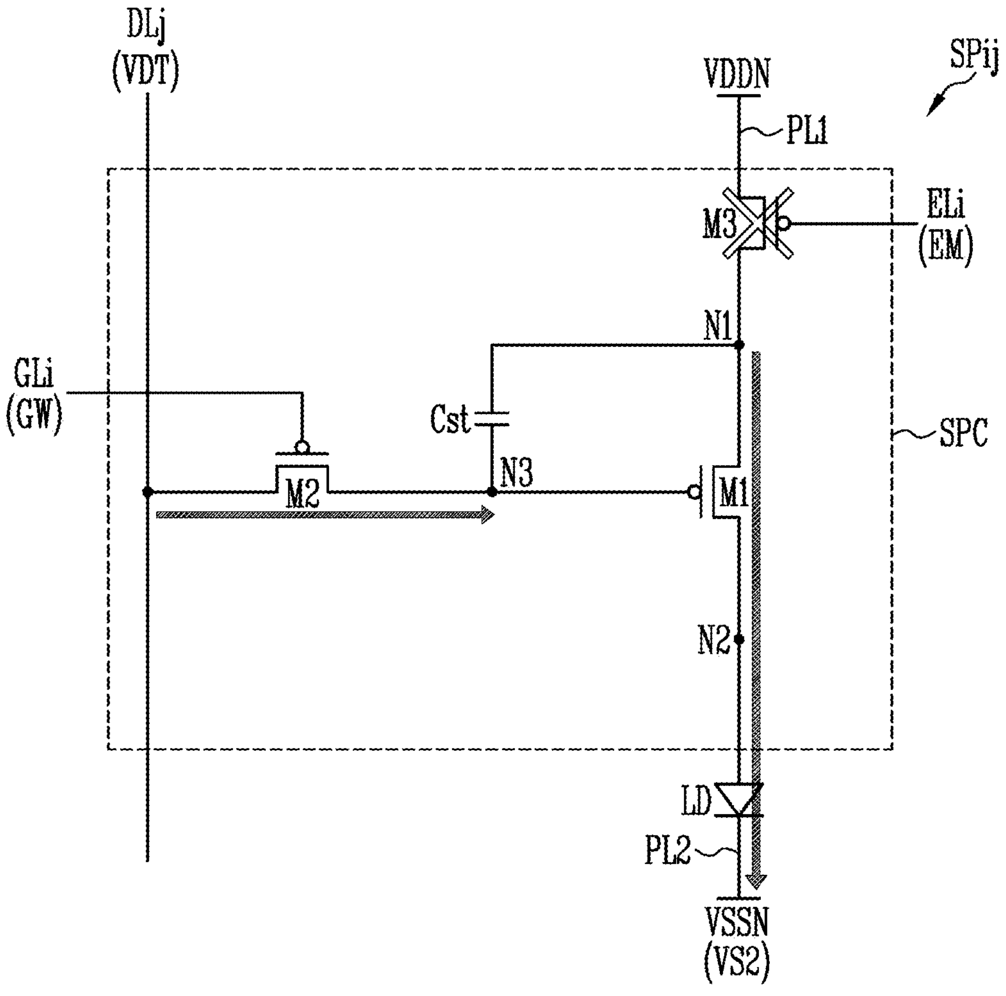

Referring to FIGS. 5 and 8, during the third period T3, the first and second transistors M1 and M2 may be maintained in the turn-on state, and the third transistor M3 may be maintained in the turn-off state.

During the third period T3, a second power voltage VSS having the second voltage level VS2 is supplied to the second power voltage node VSSN, and a data signal having the data voltage level VDT is supplied to the data line DLj.

Because the second transistor M2 is set to the turn-on state during the third period T3, the data signal having the data voltage level VDT is supplied to the third node N3. The voltage of the first node N1 may be the sum of a voltage corresponding to the data voltage level VDT and the threshold voltage of the first transistor M1. The voltage of the third node N3 may be maintained at the voltage corresponding to the data voltage level VDT. Therefore, during the second period T2, the threshold voltage of the first transistor M1 may be stored in the capacitor Cst.

Furthermore, in a manner similar to the second period T2, during the third period T3, as the second power voltage VSS has the second voltage level VS2 that satisfies the conditions allowing the light-emitting element LD to be in the non-emission state, the light-emitting element LD may be maintained in the non-emission state even when current supplied from the first transistor M1 passes through the light-emitting element LD.

Figure 9:
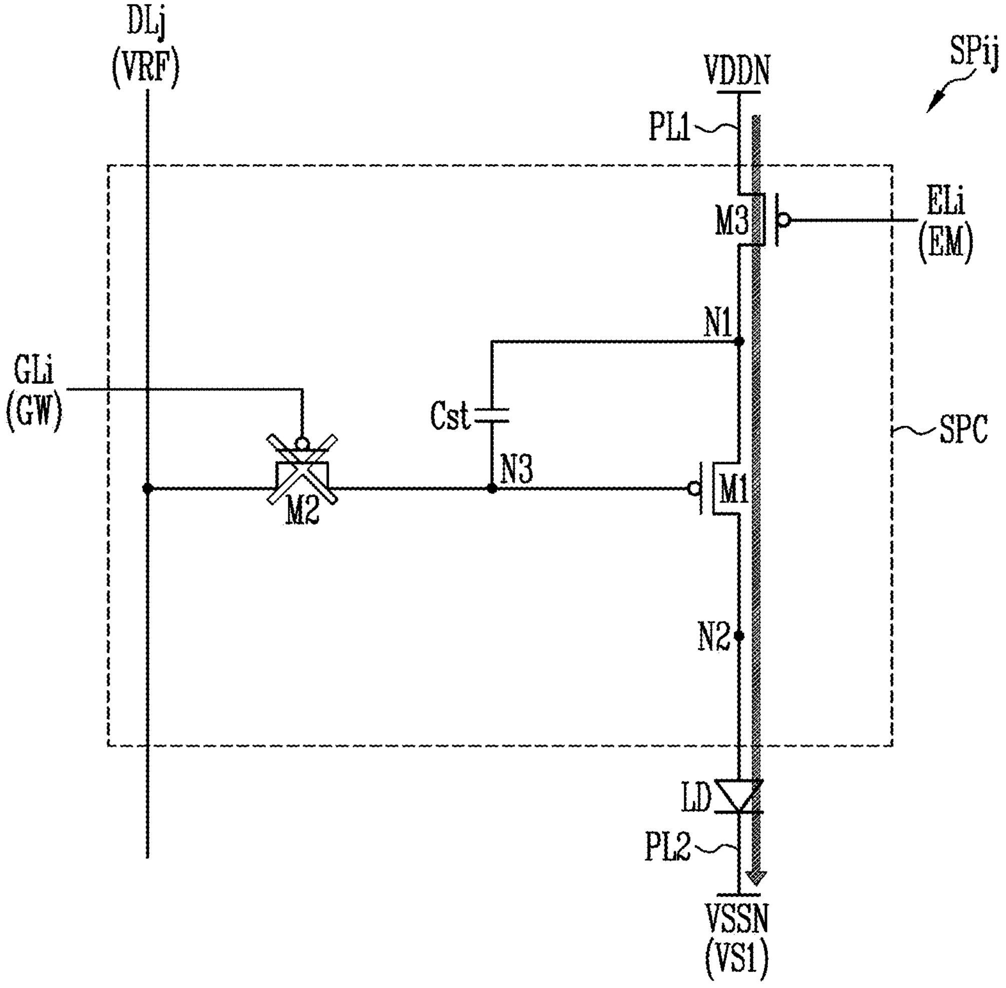

Referring to FIGS. 5 and 9, a gate signal GW for setting the second transistor M2 to a turn-off state is supplied to the gate line GLi during the fourth period T4. Furthermore, during the fourth period T4, an emission control signal EM for setting the third transistor M3 to a turn-on state is supplied to the emission control line ELi. If the third transistor M3 is turned on, the first power voltage VDD may be supplied to the first node N1.

During the fourth period T4, a second power voltage VSS having the first voltage level VS1 is supplied to the second power voltage node VSSN, and a data signal having the reference voltage level VRF is supplied to the data line DLj.

Here, the first transistor M1 may control, in response to the voltage of the third node N3, the amount of current to be supplied from the first power line PL1 supplying the first power voltage VDD to the second power line PL2 supplying the second power voltage VSS via the light-emitting element LD. During the fourth period T4, the light-emitting element LD may generate light at a luminance corresponding to the amount of driving current supplied from the first transistor M1.

Figure 10:
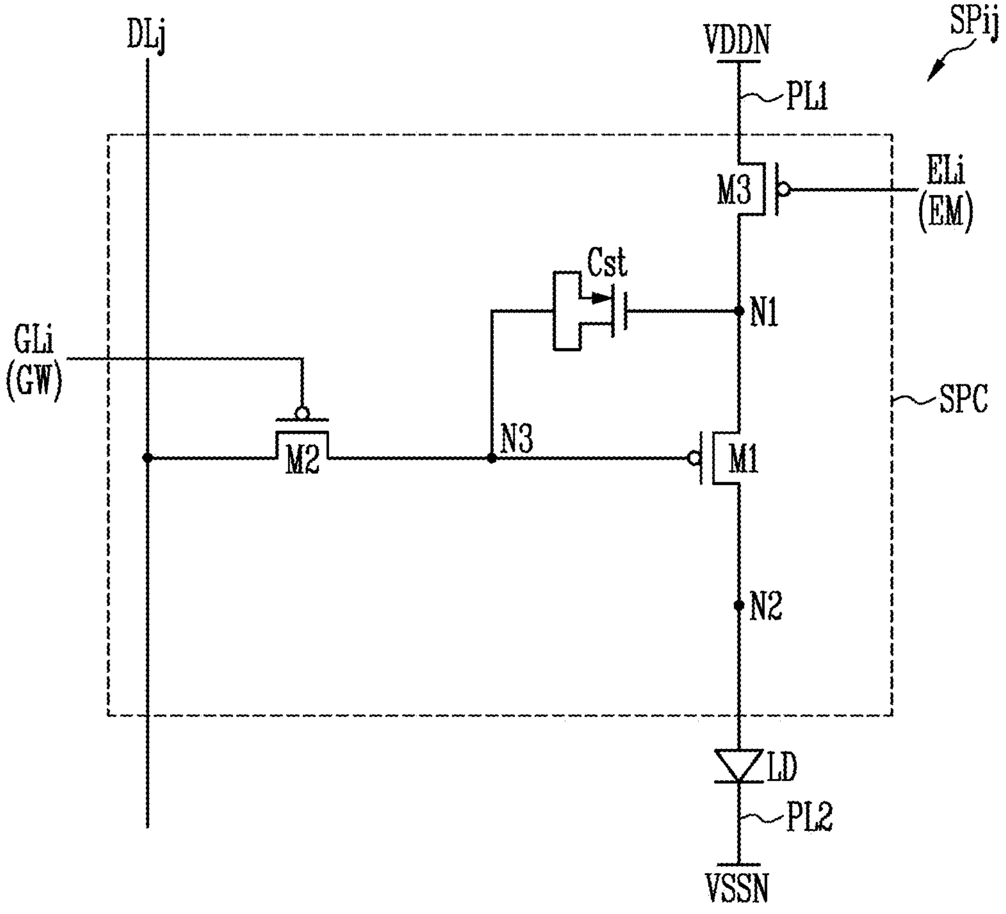
FIG. 10 is a circuit diagram illustrating one or more embodiments of the sub-pixel shown in FIG. 3.

FIG. 10 is a circuit diagram illustrating one or more embodiments of the sub-pixel SPij shown in FIG. 3.

Referring to FIG. 10, the sub-pixel SPij may include a sub-pixel circuit SPC and a light-emitting element LD. The sub-pixel circuit SPC and the light-emitting element LD of FIG. 10 may be described in a manner similar to the sub-pixel circuit SPC and the light-emitting element LD of FIG. 4, and overlapping descriptions will be simplified or omitted.

The sub-pixel circuit SPC may be connected to the i-th gate line GLi, the i-th emission control line ELi, and the j-th data line DLj. The sub-pixel circuit SPC may include first to third transistors M1, M2, and M3, and a capacitor Cst.

The capacitor Cst may be connected between the first node N1 and the third node N3. The capacitor Cst may transmit variance in voltage of the first node N1 to the third node N3.

In one or more embodiments, the capacitor Cst may be implemented using a metal oxide semiconductor (MOS) capacitor.

Figure 11:
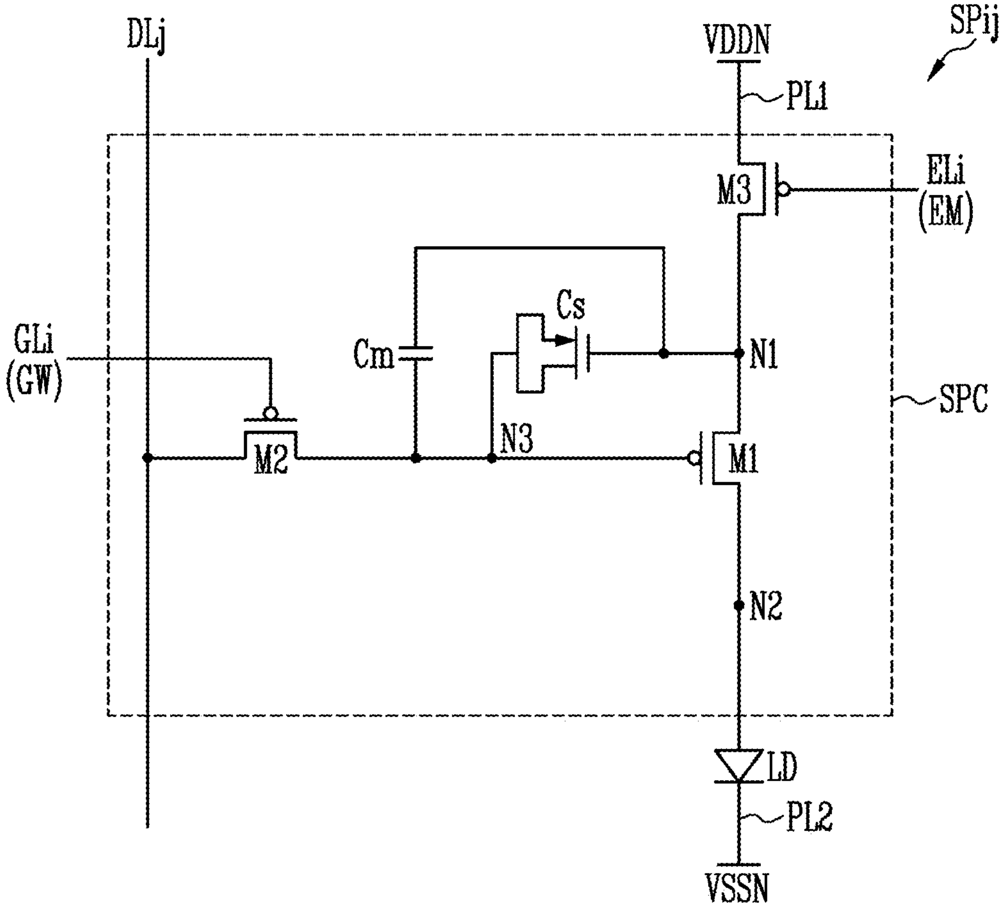
FIG. 11 is a circuit diagram illustrating one or more embodiments of the sub-pixel shown in FIG. 3.

FIG. 11 is a circuit diagram illustrating one or more embodiments of the sub-pixel SPij shown in FIG. 3.

Referring to FIG. 11, the sub-pixel SPij may include a sub-pixel circuit SPC and a light-emitting element LD. The sub-pixel circuit SPC and the light-emitting element LD of FIG. 11 may be described in a manner similar to the sub-pixel circuit SPC and the light-emitting element LD of FIG. 4, and overlapping descriptions will be simplified or omitted.

The sub-pixel circuit SPC may be connected to the i-th gate line GLi, the i-th emission control line ELi, and the j-th data line DLj. The sub-pixel circuit SPC may include first to third transistors M1, M2, and M3, a first capacitor Cm, and a second capacitor Cs.

The first capacitor Cm may be connected between the first node N1 and the third node N3. The second capacitor Cs may be connected between the first node N1 and the third node N3. In other words, the first capacitor Cm and the second capacitor Cs may be connected in parallel between the first node N1 and the third node N3. Because the first capacitor Cm and the second capacitor Cs are connected in parallel to each other, a large-capacity capacitor may be implemented.

In one or more embodiments, the first capacitor Cm may be implemented using a metal-insulator-metal (MIM) capacitor, and the second capacitor Cs may be implemented using an MOS capacitor.

In accordance with a pixel and a display device including the pixel in accordance with embodiments of the present disclosure, the pixel may be implemented using a transistor (e.g., a metal-oxide-semiconductor field-effect transistor (MOSFET)) suitable for high resolution.

While the spirit and scope of the present disclosure are described by detailed embodiments, it should be noted that the above-described embodiments are merely descriptive and should not be considered limiting. It should be understood by those skilled in the art that various changes, substitutions, and alternations may be made herein without departing from the scope of the disclosure as defined by the following claims, with functional equivalents thereof to be included therein.

The scope of the present disclosure is not limited by detailed descriptions of the present specification, and should be defined by the accompanying claims. Furthermore, all changes or modifications of the present disclosure derived from the meanings and scope of the claims, and equivalents thereof should be construed as being included in the scope of the present disclosure.

What is claimed is:

1. A pixel comprising:

a first transistor comprising a first electrode connected to a first node, a second electrode connected to a second node, and a gate electrode connected to a third node;

a second transistor connected between a data line and the third node, and comprising a gate electrode electrically connected to a first sub-gate line;

a third transistor connected between a first power line, which is configured to supply a first power voltage, and the first node, and comprising a gate electrode electrically connected to an emission control line;

a first capacitor connected between the first node and the third node; and a light-emitting element connected between the second node and a second power line, which is configured to supply a second power voltage, wherein a single frame period comprises:

an initialization period;

a compensation period;

a data write period during which the second power voltage is configured to have a second voltage level, the third transistor is configured to be set to a turn-off state, the first transistor and the second transistor are configured to be set to a turn-on state, and a data signal having a data voltage level is configured to be supplied to the data line; and an emission period in which the light-emitting element is configured to emit light at a luminance corresponding to current supplied from the first transistor, and during which the second power voltage is configured to have a first voltage level that is lower than the second voltage level, the second transistor is configured to be set to the turn-off state, the first transistor and the third transistor are configured to be set to the turn-on state, and a data signal having a reference voltage level, which is lower than the data voltage level, lower than the first power voltage, and higher than the first voltage level, is configured to be supplied to the data line.

2. The pixel according to claim 1, wherein, during the compensation period before the data write period, the third transistor is configured to be set to the turn-off state, the first transistor and the second transistor are configured to be set to the turn-on state, the data signal having the reference voltage level is configured to be supplied to the data line, and the second power voltage is configured to have the second voltage level.

3. The pixel according to claim 1, wherein, during the initialization period before the compensation period, the first transistor, the second transistor, and the third transistor are configured to be set to the turn-on state, the data signal having the reference voltage level is configured to be supplied to the data line, and the second power voltage is configured to have the first voltage level.

4. The pixel according to claim 1, wherein the first capacitor comprises a metal-insulator-metal (MIM) capacitor.

5. The pixel according to claim 1, wherein the first capacitor comprises a metal oxide semiconductor (MOS) capacitor.

6. The pixel according to claim 1, further comprising a second capacitor connected between the first node and the third node.

7. The pixel according to claim 6, wherein the first capacitor comprises a metal-insulator-metal (MIM) capacitor, and the second capacitor comprises a metal oxide semiconductor (MOS) capacitor.

8. The pixel according to claim 1, wherein the first voltage level and the second voltage level are lower than the first power voltage.

9. A display device, comprising pixels connected to gate lines, data lines, and emission control lines, wherein one of the pixels at an i-th pixel row and at a j-th pixel column (i and j being integers) comprises:

a first transistor comprising a first electrode connected to a first node, a second electrode connected to a second node, and a gate electrode connected to a third node;

a second transistor connected between a j-th data line among the data lines and the third node, and configured to receive a gate signal through an i-th gate line among the gate lines;

a third transistor connected between the first node and a first power line configured to supply a first power voltage, and configured to receive an emission control signal through an i-th emission control line among the emission control lines;

a first capacitor connected between the first node and the third node; and a light-emitting element connected between the second node and a second power line configured to supply a second power voltage, wherein a single frame period comprises:

an initialization period;

a compensation period;

a data write period during which the second power voltage is configured to have a second voltage level, the gate signal for setting the second transistor to a turn-on state is configured to be supplied to the i-th gate line, the emission control signal for setting the third transistor to a turn-off state is configured to be supplied to the i-th emission control line, and a data signal having a data voltage level is configured to be supplied to the j-th data line; and an emission period in which the light-emitting element is configured to emit light at a luminance corresponding to current supplied from the first transistor, and during which the second power voltage is configured to have a first voltage level that is lower than the second voltage level, the emission control signal for setting the third transistor to the turn-on state is configured to be supplied to the i-th emission control line, the gate signal for setting the second transistor to the turn-off state is configured to be supplied to the i-th gate line, and a data signal having a reference voltage level, which is lower than the data voltage level, lower than the first power voltage, and higher than the first voltage level, is configured to be supplied to the j-th data line.

10. The display device according to claim 9, wherein, during the compensation period before the data write period, the gate signal for setting the second transistor to the turn-on state is configured to be supplied to the i-th gate line, the emission control signal for setting the third transistor to the turn-off state is configured to be supplied to the i-th emission control line, and the data signal having the reference voltage level is configured to be supplied to the j-th data line.

11. The display device according to claim 9, wherein the first capacitor comprises a metal-insulator-metal (MIM) capacitor.

12. The display device according to claim 9, wherein the first capacitor comprises a metal oxide semiconductor (MOS) capacitor.

13. The display device according to claim 9, further comprising a second capacitor connected between the first node and the third node, and wherein the first capacitor comprises a metal-insulator-metal (MIM) capacitor, and the second capacitor comprises a metal oxide semiconductor (MOS) capacitor.

* * * * *